(12) United States Patent
Moia et al.

(10) Patent No.: US 10,392,029 B2
(45) Date of Patent: Aug. 27, 2019

(54) METHOD AND DEVICE FOR THE OUTPUT OF HAPTIC INFORMATION TO THE DRIVER OF A MOTOR VEHICLE VIA THE BRAKE PEDAL

(71) Applicant: Robert Bosch GmbH, Stuttgart (DE)

(72) Inventors: Alessandro Moia, Holzgerlingen (DE); Armin Verhagen, Schwieberdingen (DE); Laszlo Boros, Ludwigsburg (DE); Simon Hansmann, Plymouth, MI (US); Thomas Friedrich, Ingersheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/940,208

(22) Filed: Mar. 29, 2018

(65) Prior Publication Data

US 2018/0297613 A1    Oct. 18, 2018

(30) Foreign Application Priority Data

Apr. 12, 2017  (DE) .......................... 10 2017 206 264

(51) Int. Cl.
*B60Q 1/00* (2006.01)
*B60W 50/16* (2012.01)
(Continued)

(52) U.S. Cl.
CPC ............ *B60W 50/16* (2013.01); *B60K 26/02* (2013.01); *B60Q 9/008* (2013.01); *B60T 7/042* (2013.01); *B60T 7/06* (2013.01); *B60T 8/00* (2013.01); *B60T 8/17* (2013.01); *B60W 30/0956* (2013.01); *G05G 1/32* (2013.01); *B60K 2026/022* (2013.01); *B60Q 9/00* (2013.01); *B60T 7/04* (2013.01); *B60T 8/3255* (2013.01); *B60T 2201/03* (2013.01); *B60T 2210/32* (2013.01);
(Continued)

(58) Field of Classification Search
CPC ............ B60W 50/16; B60W 30/0956; B60W 2550/308; B60W 30/18154; B60K 26/02; B60K 2026/022; B60Q 9/008; B60Q 9/00; G05G 1/32; B60T 8/17; B60T 8/00; B60T 7/06; B60T 7/042; B60T 2210/36; B60T 2210/32; B60T 2201/03; B60T 8/3255; B60T 2220/04; B60T 7/04
USPC .... 340/438, 439, 905, 435, 436; 701/1, 301, 701/36
See application file for complete search history.

(56) References Cited

U.S. PATENT DOCUMENTS

| 7,518,492 B2 * | 4/2009 | Grill ........................ B60Q 9/00 340/439 |
| 2007/0198136 A1 * | 8/2007 | Kobayashi ........... B60K 26/021 701/1 |

(Continued)

FOREIGN PATENT DOCUMENTS

DE    102011117297 A1    5/2013

*Primary Examiner* — Anh V La
(74) *Attorney, Agent, or Firm* — Norton Rose Fulbright US LLP; Gerard Messina

(57) ABSTRACT

A method for output of haptic information to a driver of a motor vehicle via a brake pedal includes ascertaining, based on signals of an environment-sensor system, imminence of a traffic situation that poses a potential risk to the motor vehicle, and modifying, during a driving of the motor vehicle, independent of a driver input, and in response to the ascertained imminence of the traffic situation, a characteristic of the brake pedal of the motor vehicle.

9 Claims, 2 Drawing Sheets

(51) Int. Cl.
*B60Q 9/00* (2006.01)
*B60K 26/02* (2006.01)
*B60W 30/095* (2012.01)
*B60T 7/04* (2006.01)
*B60T 7/06* (2006.01)
*B60T 8/00* (2006.01)
*B60T 8/17* (2006.01)
*G05G 1/32* (2008.04)
*B60W 30/18* (2012.01)
*B60T 8/32* (2006.01)

(52) U.S. Cl.
CPC ....... *B60T 2210/36* (2013.01); *B60T 2220/04* (2013.01); *B60W 30/18154* (2013.01); *B60W 2550/308* (2013.01)

(56) References Cited

U.S. PATENT DOCUMENTS

| | | | |
|---|---|---|---|
| 2010/0194593 A1* | 8/2010 | Mays | B60Q 5/006 340/905 |
| 2016/0185347 A1* | 6/2016 | Lefevre | B60W 30/09 701/301 |
| 2016/0236681 A1* | 8/2016 | Nguyen Van | G08G 1/166 |

* cited by examiner

METHOD AND DEVICE FOR THE OUTPUT OF HAPTIC INFORMATION TO THE DRIVER OF A MOTOR VEHICLE VIA THE BRAKE PEDAL

CROSS-REFERENCE TO RELATED APPLICATIONS

The present application claims priority under 35 U.S.C. § 119 to DE 10 2017 206 264.9, filed in the Federal Republic of Germany on Apr. 12, 2017, the content of which is hereby incorporated by reference herein in its entirety.

FIELD OF THE INVENTION

The present invention relates to providing haptic information to a driver of a motor vehicle via a brake pedal.

BACKGROUND

The brake pedals of known automotive brake systems have a force/travel characteristic that is set during the development of the vehicles and is unable to be adapted as a function of the situation.

With the introduction of electric drives, which are capable of recuperating energy during a braking operation, approaches were developed that adapt the force/travel characteristic of the brake pedal and inform the driver, with the aid of a "pressure point," of the position of the brake pedal at which the disk brakes engage. At this position, the resistance force or the response force of the brake pedal increases. Such a system enables the driver to brake purely electrically, to optimize the energy regeneration, and to employ the disk brakes only when necessary.

A method for operating a driver-assistance system as well as an associated driver-assistance system are known from the document DE 10 2011 117 297 A1. A loudspeaker, i.e., a signal-tone generator, as well as various haptic means, e.g., a vibration motor, are provided as output means in the steering wheel and on the foot pedals.

SUMMARY

The present invention relates to a method for outputting haptic information to the driver of a motor vehicle via the brake pedal. The pedal characteristic of the brake pedal is capable of being modified during the travel in a manner that is independent of the driver. The imminence of a traffic situation that poses a potential risk to the motor vehicle is ascertained with the aid of an environment-sensor system, and the pedal characteristic is modified as a function of the ascertained traffic situation. This provides assistance for the driver in the safe handling of an upcoming traffic situation.

One characteristic feature of an example embodiment of the present invention is that the pedal characteristic describes the correlation between a counterforce quantity that characterizes the counterforce acting on the driver's foot through the brake pedal, and a pedal-travel quantity that characterizes the pedal travel of the brake pedal.

One characteristic feature of an example embodiment of the present invention is that a brake force that is optimal for managing the impending traffic situation is ascertained, and that the pedal characteristic is modified in such a way that the counterforce of the brake pedal is reduced when the brake force applied by the driver is less than the optimal brake force and is increased when the brake force applied by the driver is greater than the optimal brake force. This motivates the driver, as a function of the optimal brake force, to operate the brake pedal with lesser or greater force and thereby guides the brake force applied by the driver in the direction of the ascertained optimal brake force.

A characteristic feature of an example embodiment of the present invention is that the impending traffic situation involves an upcoming curve.

A characteristic feature of an example embodiment of the present invention is that the impending traffic situation involves an upcoming intersection.

A characteristic feature of an example embodiment of the present invention is that the impending traffic situation involves an approaching of a vehicle that is driving ahead.

A characteristic feature of an example embodiment of the present invention is that the impending traffic situation involves the approach of a trailing vehicle.

A characteristic feature of an example embodiment of the present invention is that the environment-sensor system is a camera system, a radar system, an ultrasonic system, a GPS system, or a Car2X system.

In addition, the present invention encompasses a device developed to carry out the method according to the present invention. For example, in an example embodiment, the device includes a control unit in which the program code of the method according to the present invention is stored.

DETAILED DESCRIPTION

Over the past few years, more and more sensors have been introduced in automotive systems for the purpose of detecting the environment. For instance, these are camera systems, radar systems, ultrasonic systems, GPS systems, or Car2X systems. The present invention relates to the adaptation of the force/travel characteristic of the brake pedal to the detected vehicle environment or to the driving situation in order to supply important haptic information to the driver for an optimal braking operation. This results in gains in comfort for the driver as a result of the haptic interventions because the driver is able to execute the optimal deceleration profiles that increase the driving comfort, as well as gains in safety for the driver inasmuch as the haptic interventions enable the driver to execute the deceleration profiles that minimize the risk of an accident, and the driver additionally receives information via the haptic interventions without having to take the driver's eyes off the road.

Conceivable as haptic interventions are both the modification of the force/travel characteristic of the brake pedal and the provision of haptic information to the driver with the aid of a vibration of the brake pedal.

Figure 1:
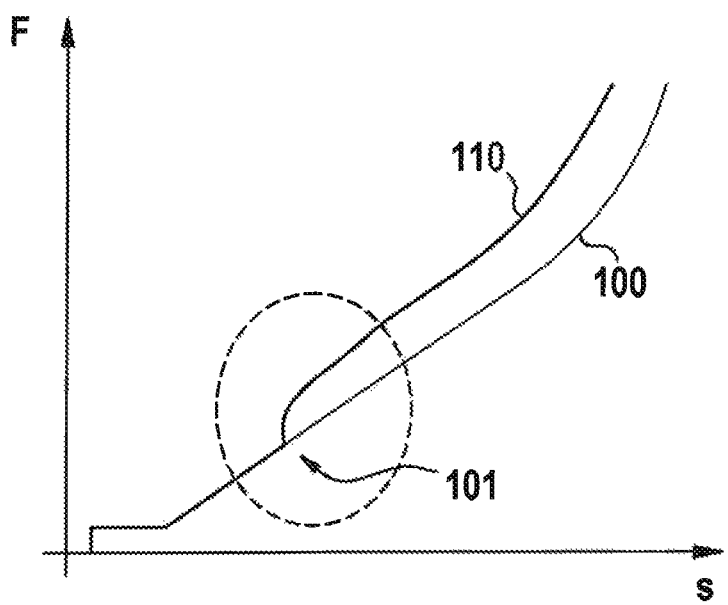
FIG. 1 shows an increase in the force/travel characteristic according to an example embodiment of the present invention.
Figure 2:
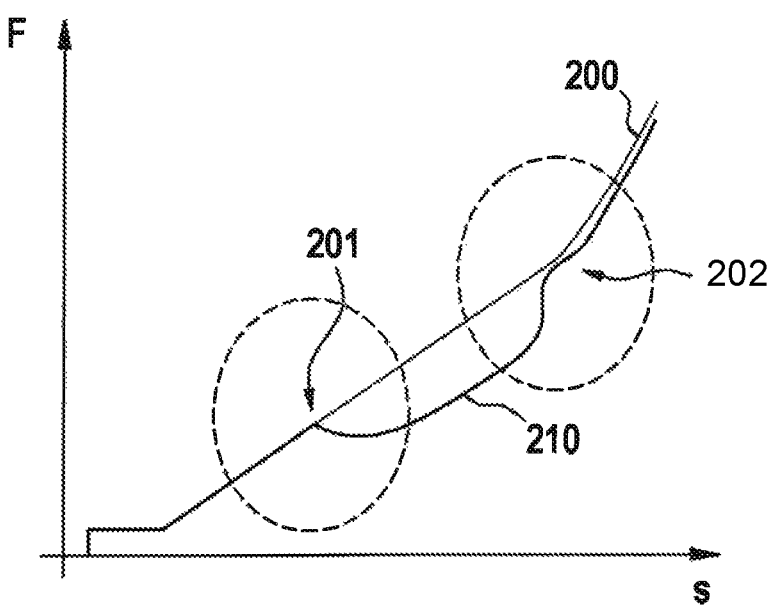
FIG. 2 shows a decrease in the force/travel characteristic according to an example embodiment of the present invention.

In FIGS. 1 and 2, brake-pedal travel 's' has been plotted in the direction of the abscissa, and resistance force 'F' by which the brake pedal reacts to the driver's foot has been plotted in the direction of the ordinate. Such a characteristic is termed a force/travel characteristic.

Characteristics 100 and 200 represent the standard characteristic, which is set without taking the vehicle environment into account.

In FIG. 1, 110 represents a characteristic at which, starting at a pressure point that is denoted by 101, the resistance force or the reaction force is increased in comparison with the standard characteristic. In other words, if the driver exceeds the pedal travel associated with point 101, then a considerable increase in the resistance force will be encountered. The intention is to motivate the driver not to brake even more forcefully in this instance. Of course, the reaction force can also be overridden in this case in that the driver operates the brake pedal at a greater force.

In FIG. 2, 210 denotes a characteristic curve where, starting at a pressure point denoted by 201, the resistance force or reaction force will be reduced. In other words, if the driver exceeds the pedal travel associated with point 201, the resistance force is kept constant or increases only slowly. The counterforce acting on the driver's foot is less than usually expected by the driver, and the driver is meant to be motivated to operate the brake pedal more forcefully. Starting at point 202, the reduction of the counterforce ends, and characteristic curve 210 adapts itself again to standard characteristic 200.

To provide the driver with additional information such as a prompt to initiate a full braking operation, it is also possible to actuate different vibration patterns with the aid of the brake pedal.

In the following text, a number of exemplary situations are examined.

1) With the aid of GPS data, e.g., the curve radius and curve slope, as well as data received in a wireless manner from a vehicle-external database, e.g., the condition of the road and the coefficient of friction of the road, an optimal cornering velocity is able to be ascertained, which allows for a safe passage through a curve located directly ahead. If the driver is driving too fast when approaching the curve and does not brake with sufficient strength, then the resistance force of the brake pedal is able to be reduced in order to motivate the driver to implement more forceful braking. For instance, in the example of FIG. 2, this can be done in that a switch takes place from pedal characteristic 200 to pedal characteristic 210. At the marked point 202 in FIG. 2, the brake-pedal counterforce is increased again since the optimal brake pressure has been reached. If the driver fails to brake with enough force, the driver can also additionally be prompted through haptic vibrations of the brake pedal to press the brake pedal again.

2) With the aid of GPS data, such as the distance from an intersection directly ahead and the road inclination, and also data received in a wireless manner from a vehicle-external database, e.g., the road condition and the coefficient of friction of the road, an optimal deceleration profile is able to be ascertained, which allows the vehicle to safely come to a standstill in front of an intersection that is located directly ahead. If the driver drives too fast ahead of the intersection and fails to brake forcefully enough, then the resistance force of the brake pedal is able to be reduced in order to motivate the driver to brake at a greater force. For instance, in the example of FIG. 2, this can be done in that a switch takes place from pedal characteristic 200 to pedal characteristic 210. At the marked point 202 in FIG. 2, the brake-pedal counterforce is increased again since the optimal brake pressure has been reached. If the driver fails to brake with enough force, the driver can also be prompted through haptic vibrations of the brake pedal to press the brake pedal again.

3) With the aid of camera and radar data as well as Car2X data, it is possible to ascertain the velocity profiles of other road users, and on that basis, to ascertain the optimal velocity profile of the ego vehicle so that potential accidents are able to be avoided. It may happen that the driver overestimates the distance to the vehicle traveling ahead and does not brake adequately. If the driver then suddenly notices that the current vehicle deceleration is insufficient, the driver presses the brake pedal again and possibly even initiates emergency braking. If this situation is detected, i.e., insufficient braking on the part of the driver, then the resistance force of the brake pedal can be lowered as a motivation for the driver to brake more forcefully. For example, in the example of FIG. 2, this can be done in that a switch takes place from pedal characteristic 200 to pedal characteristic 210. At the marked point 202 in FIG. 2, the brake-pedal counterforce is increased again since the optimal brake pressure has been reached. If the driver fails to brake with enough force, the driver can additionally also be prompted through haptic vibrations of the brake pedal to press the brake pedal again.

4) With the aid of camera, radar, and Car2X data, the velocity profiles of other road users and, on that basis, the optimal velocity profile of the ego vehicle, are able to be ascertained in order to avoid potential accidents. It is conceivable that a vehicle driving behind the ego vehicle fails to brake in time and rams the ego vehicle from behind. If it is then detected on the basis of camera, radar, and Car2X data that a sufficiently long, free braking distance is available in front of the ego vehicle, the pedal characteristic according to FIG. 1 is capable of being modified in such a way that the brake pedal exhibits a greater resistance force. This motivates the driver to brake less forcefully and to thereby reduce the relative velocity with respect to the trailing vehicle. This not only reduces the likelihood of a potential rear collision but also the accident severity of a potential rear collision caused by the trailing vehicle.

5) With the aid of GPS data, such as the curve radii and the curve slope, and also data received from a vehicle-external database in a wireless manner, such as the condition of the road and the coefficient of friction of the road, an optimal cornering velocity and an optimal braking point are able to be ascertained, which allow for the passage through a curve that is immediately ahead using the greatest possible dynamics. For example, such a functionality can be enabled for the driver on racetracks that are blocked to public road traffic so that the driver is able to increase his or her driving capabilities.

Figure 3:
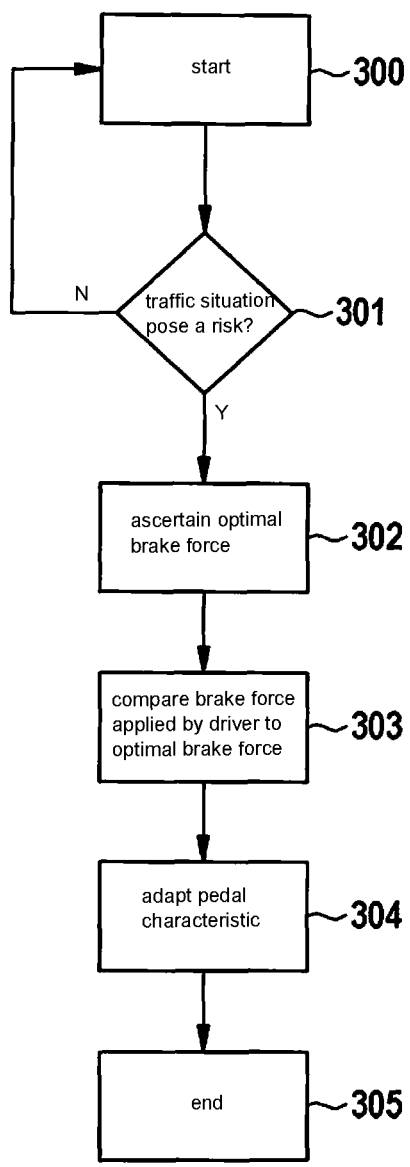
FIG. 3 is a flowchart that illustrates a method according to an example embodiment of the present invention.

FIG. 3 illustrates an example method for the output of haptic information to the driver of a motor vehicle. After the start of the method in block 300, it is determined in block 301 with the aid of an environment-sensor system whether a traffic situation is looming that can potentially pose a risk to the motor vehicle. If this is not the case, then a return to block 300 takes place. However, if this is indeed the case, then the particular brake force that is optimal for the safe management of the impending traffic situation is ascertained in block 302. In block 303, the brake force applied by the driver is compared to the optimal brake force, and in block 304, the pedal characteristic of the brake pedal is adapted as a function thereof in order to guide the driver to the optimal brake force. The present method ends in block 305.

What is claimed is:

1. A method comprising:
ascertaining, by a processor and based on signals of an environment-sensor system, imminence of a traffic situation that poses a potential risk to a motor vehicle; and
modifying, by the processor, during a driving of the motor vehicle, independent of a driver input, and in response to the ascertained imminence of the traffic situation, a characteristic of a brake pedal of the motor vehicle, thereby providing haptic information to a driver of the motor vehicle, wherein the pedal characteristic describes the correlation between a counterforce quantity that characterizes a counterforce acting on the driver's foot through the brake pedal, and a pedal-travel quantity that characterizes a pedal travel of the brake pedal;
ascertaining a brake force that is optimal for managing the imminent traffic situation;
determining that a brake force applied by the driver is less than the ascertained optimal brake force; and
based on determining that the brake force applied by the driver is less than the ascertained optimal brake force, modifying the pedal characteristic in a manner by which the counterforce of the brake pedal acting on the driver's foot through the brake pedal is reduced.

2. The method of claim 1, wherein the impending traffic situation involves an upcoming curve.

3. The method of claim 1, wherein the impending traffic situation involves an intersection that is located ahead.

4. The method of claim 1, wherein the impending traffic situation involves an approach of a vehicle driving ahead.

5. The method of claim 1, wherein the impending traffic situation involves an approach by a trailing vehicle.

6. The method of claim 1, wherein the environment-sensor system includes a camera, a radar, an ultrasonic sensor, a GPS, or a Car2X system.

7. A system comprising:
a brake pedal;
an environment sensor; and
a processor, wherein the processor is configured to ascertain, based on signals obtained from the environment-sensor, imminence of a traffic situation that poses a potential risk to a motor vehicle; and
modify, during a driving of the motor vehicle, independent of a driver input, and in response to the ascertained imminence of the traffic situation, a characteristic of the brake pedal of the motor vehicle, thereby providing haptic information to a driver of the motor vehicle wherein the pedal characteristic describes the correlation between a counterforce quantity that characterizes a counterforce acting on the driver's foot through the brake pedal, and a pedal-travel quantity that characterizes a pedal travel of the brake pedal;
ascertain a brake force that is optimal for managing the imminent traffic situation; and
when a brake force applied by the driver is less than the optimal brake force, modify the pedal characteristic in a manner by which the counterforce acting on the driver's foot through the brake pedal is reduced.

8. A method comprising:
ascertaining, by a processor and based on signals of an environment-sensor system, imminence of a traffic situation that poses a potential risk to a motor vehicle; and
modifying, by the processor, during a driving of the motor vehicle, independent of a driver input, and in response to the ascertained imminence of the traffic situation, a characteristic of a brake pedal of the motor vehicle, thereby providing haptic information to a driver of the motor vehicle, wherein the pedal characteristic describes the correlation between a counterforce quantity that characterizes a counterforce acting on the driver's foot through the brake pedal, and a pedal-travel quantity that characterizes a pedal travel of the brake pedal;
ascertaining a brake force that is optimal for managing the imminent traffic situation;
determining that a brake force applied by the driver is greater than the ascertained optimal brake force; and
based on determining that the brake force applied by the driver is greater than the ascertained optimal brake force, modifying the pedal characteristic in a manner by which the counterforce of the brake pedal acting on the driver's foot through the brake pedal is increased.

9. A system comprising:
a brake pedal;
an environment sensor; and
a processor, wherein the processor is configured to ascertain, based on signals obtained from the environment-sensor, imminence of a traffic situation that poses a potential risk to a motor vehicle; and
modify, during a driving of the motor vehicle, independent of a driver input, and in response to the ascertained imminence of the traffic situation, a characteristic of the brake pedal of the motor vehicle, thereby providing haptic information to a driver of the motor vehicle, wherein the pedal characteristic describes the correlation between a counterforce quantity that characterizes a counterforce acting on the driver's foot through the brake pedal, and a pedal-travel quantity that characterizes a pedal travel of the brake pedal;
ascertain a brake force that is optimal for managing the imminent traffic situation; and
when a brake force applied by the driver is greater than the optimal brake force, modify the pedal characteristic in a manner by which the counterforce acting on the driver's foot through the brake pedal is increased.

* * * * *